(12) United States Patent
Collins

(10) Patent No.: US 12,138,895 B2
(45) Date of Patent: Nov. 12, 2024

(54) SEALING PRODUCTS FOR INDIVIDUAL WELLS IN MULTI-WELL ARRAYS

(71) Applicant: 4titude Ltd, Surrey (GB)

(72) Inventor: Peter Collins, Shamley Green (GB)

(73) Assignee: 4titude Ltd, Surrey (GB)

( * ) Notice: Subject to any disclaimer, the term of this patent is extended or adjusted under 35 U.S.C. 154(b) by 60 days.

(21) Appl. No.: 18/059,317

(22) Filed: Nov. 28, 2022

(65) Prior Publication Data
US 2023/0088944 A1 Mar. 23, 2023

Related U.S. Application Data

(62) Division of application No. 16/345,649, filed as application No. PCT/GB2017/000184 on Dec. 27, 2017, now Pat. No. 11,511,510.

(51) Int. Cl.
*B65B 7/28* (2006.01)
*B01L 3/00* (2006.01)
(Continued)

(52) U.S. Cl.
CPC ............ *B32B 3/08* (2013.01); *B01L 3/50825* (2013.01); *B01L 3/5085* (2013.01); *B32B 3/266* (2013.01);
(Continued)

(58) Field of Classification Search
CPC ........... B32B 3/08; B32B 3/06; B65B 7/2878; B65B 7/28; B65B 61/04; B65B 61/10; B67B 3/00; B67B 3/04; B01L 3/50853
See application file for complete search history.

(56) References Cited

U.S. PATENT DOCUMENTS

| | | | | |
|---|---|---|---|---|
| 3,584,430 A | * | 6/1971 | Shearer | B65B 61/06 53/449 |
| 3,838,550 A | * | 10/1974 | Mueller | B29C 66/961 219/244 |
| 4,035,987 A | * | 7/1977 | Nakazato | B65B 7/167 53/298 |
| 4,380,484 A | * | 4/1983 | Repik | B29C 66/53461 156/530 |

(Continued)

FOREIGN PATENT DOCUMENTS

WO 2018087510 A2 5/2018

OTHER PUBLICATIONS

Notification of Transmittal of the International Search Report and Written Opinion issued in corresponding International Application No. PCT/GB2017/000184 Dated: Jul. 19, 2018 (15 pgs).

*Primary Examiner* — Gloria R Weeks
(74) *Attorney, Agent, or Firm* — Hamilton, Brook, Smith & Reynolds, P.C.

(57) ABSTRACT

A heat sealing product suitable for sealing one or more individual containers, the heat sealing product comprising: (i) a plurality of individual heat seals set out in a configuration substantially corresponding to the shape and configuration of the container(s) to be sealed, the size and shape of the individual heat seals corresponding substantially to the size and shape of the tops of the individual container(s) to be sealed;
(ii) a peelable support film layer coated on one side with a low tack adhesive, the low tack adhesive serving to hold the individual heat seals in place on the support film layer in the desired configuration prior to the sealing process;
(iii) alignment points in the sealing product adapted to enable the heat sealing product and therefore the individual heat seals of the heat sealing product to be aligned substantially exactly with respect to the individual containers to be sealed.

14 Claims, 2 Drawing Sheets

(51) Int. Cl.
*B32B 3/06* (2006.01)
*B32B 3/08* (2006.01)
*B32B 3/26* (2006.01)
*B32B 7/06* (2019.01)
*B32B 7/12* (2006.01)
*B32B 27/08* (2006.01)
*B32B 27/10* (2006.01)
*B32B 27/36* (2006.01)

(52) U.S. Cl.
CPC .............. *B32B 7/06* (2013.01); *B32B 7/12* (2013.01); *B32B 27/08* (2013.01); *B32B 27/10* (2013.01); *B32B 27/36* (2013.01); *B65B 7/2878* (2013.01); *B01L 2200/0689* (2013.01); *B01L 2200/12* (2013.01); *B01L 2300/0829* (2013.01); *B32B 2307/31* (2013.01); *B32B 2307/748* (2013.01); *B32B 2553/00* (2013.01); *B65B 7/28* (2013.01)

(56) References Cited

U.S. PATENT DOCUMENTS

| | | | |
|---|---|---|---|
| 4,682,463 A * | 7/1987 | Foldesi | B65B 7/2878 |
| | | | 53/308 |
| 5,282,543 A | 2/1994 | Picozza et al. | |
| 6,564,846 B1 * | 5/2003 | Ribi | B67B 7/00 |
| | | | 53/329.2 |
| 6,632,653 B1 | 10/2003 | Astle | |
| 6,878,345 B1 * | 4/2005 | Astle | G01N 35/00009 |
| | | | 422/66 |
| 11,511,510 B2 * | 11/2022 | Collins | B32B 3/08 |
| 2004/0184977 A1 | 9/2004 | Goodwin | |
| 2006/0134388 A1 * | 6/2006 | Miller | D04H 3/16 |
| | | | 428/174 |
| 2012/0087848 A1 * | 4/2012 | Nakahana | B65B 7/2878 |
| | | | 422/550 |
| 2012/0230892 A1 * | 9/2012 | Peterson | B01L 3/50853 |
| | | | 156/247 |
| 2020/0079537 A1 * | 3/2020 | Shu | B65B 7/168 |

* cited by examiner

SEALING PRODUCTS FOR INDIVIDUAL WELLS IN MULTI-WELL ARRAYS

This application is a Divisional Application of Ser. No. 16/345,649 filed Apr. 26, 2019, now U.S. U.S. Pat. No. 11,511,510, issued Nov. 29, 2022, which is the U.S. National Stage of International Application No. PCT/GB2017/000184, filed Dec. 27, 2017, which designates the U.S., published in English, and claims priority under 35 U.S.C. § 119 or 365(c) to GB Application No. 1618215.6, filed Oct. 27, 2016. The entire teachings of the above applications are incorporated herein by reference.

FIELD OF THE INVENTION

The present invention relates to sealing means for sealing wells, vials or other containers. It is particularly applicable, but in no way limited, to sealing products, sealing apparatus and methods suitable for sealing a variety of containers as well as individual wells, particularly when those wells are arranged in a multi-well array.

BACKGROUND TO THE INVENTION

A wide variety of containers or vessels are used extensively in medical and biological research. These vessels can take a number of different forms and come in a variety of different shapes, sizes and volumes. Such vessels can be referred to by a number of different terms, such as 'wells', 'vials', 'troughs', 'tubes' or by the generic all embracing term 'containers'. These terms will be used interchangeably in the following description. Wells are often conveniently arranged in a multi-well plate format and these are commercially available in 6/12/24/48/96/384/1536 multi-well plate designs. The footprint dimensions of these multi-well plates remain substantially constant, with the only variation being the number of wells in the plate, and of course the volume of the wells.

The individual wells may be moulded into a multi-well plate format, and thus the wells are held captive in the desired array, or alternatively a collection of individual wells may be arranged in the desired format using some form of support or frame which holds the individual wells in place temporarily. In this latter arrangement individual wells can be removed from the initial array as required and reorganised into a different array or into a collection of different wells, giving much greater flexibility to the experimenter than a fixed array of wells. With a collection of individual wells, the wells need not necessarily all be the same size and/or shape, It is often desirable or necessary to cover or seal some or all of the wells in a multi-well plate or array of individual wells. A variety of sealing means have been used to achieve this, including caps, lids, mats, adhesive seals and heat seals. Applying individual caps to a plate or array of individual wells is both time consuming and labour intensive. The sealing performance of heat seals is generally considered superior to all other methods including cap, mat and adhesive sealing. Advantageously heat sealing can provide a substantially permanent seal to the wells, whilst still leaving the contents of the tube or well visible so that certain measurements can be taken, or the contents may still be accessible in the case of pierceable seals. Heat sealing is usually achieved by placing a sheet or roll of heat sealing material over the whole plate in a heat sealer machine and applying heat and pressure. However, heat sealing in this conventional manner has the disadvantage that the sheet or roll of heat sealing film inevitably joins the individual wells together into a fixed array, if they are not already moulded into a multi-well plate format. In order to process the sealed wells individually, the individual sealed wells have to be separated very carefully from each other, without disturbing the seals around the tops of the individual wells, which again is both time consuming and labour intensive.

In addition, there are numerous other applications in the medical, medical devices and natural sciences fields where containers, or collections of containers, of various different shapes, sizes and depths would benefit from heat sealing. Where the containers have a raised peripheral rim it would be an advantage if only the individual containers were subject to heat sealing, and not other areas, In addition there are often holes, apertures or voids in a container collection that need to be kept clear of any obstruction. This presents a real problem when a sheet of heat sealing product is used which, by definition, covers an entire area without any holes or apertures. Such holes have to be made manually after sealing.

It is an object of the present invention to overcome or mitigate some or all of the disadvantages outlined above.

SUMMARY OF THE INVENTION

According to a first aspect of the present invention there is provided a heat sealing product suitable for sealing a plurality of individual containers, said heat sealing product comprising:

(i) a plurality of discrete individual heat seals set out in a configuration substantially corresponding to the shape and configuration of the containers to be sealed, the size and shape of the discrete individual heat seals corresponding substantially to the size and shape of the tops of the individual containers to be sealed;

(ii) a peelable support film layer coated on one side with a low tack adhesive, the low tack adhesive serving to hold the discrete individual heat seals in place on the support film layer in the desired configuration prior to the sealing process;

(iii) alignment points in the sealing product adapted to enable the heat sealing product and therefore the discrete individual heat seals of the heat sealing product to be aligned substantially exactly with respect to the individual containers to be sealed.

This new heat sealing product provides for the first time the capability of sealing an individual container or array of individual containers with a conventional heat sealing film, whilst retaining the containers as individual items. The heat seal labels are discrete individual labels, which is to say that although mounted on a common support film layer prior to transfer onto the wells/containers they are independent of each other (separated/divided from each other) so that they are able to be transferred individually each onto their own respective individual container. The heat seal labels suitably are rendered as such discrete individual labels by cutting or stamping the labels from a larger heat seal layer/sheet. They are kept in array on the support film layer prior to transfer onto the containers so that where required they can be transferred onto an array of wells or other containers substantially simultaneously or in batches, eg rows or columns, but still independently of each other so that in the thus sealed array of wells/containers the wells/containers remain independent of each other and can still be individually handled.

Preferably the heat sealing product is devoid of any heat sealing material around or between the individual heat seals and preferably there are discreet interstitial gaps between the individual heat seals in the array. Removal of surplus, unwanted heat sealing material simplifies the heat sealing process and in particular removing the waste stops the completed heat seals from becoming connected to the waste material by excess melt.

Where unwanted heat sealing material has been removed from around the individual heat seals, the sealing product preferably further comprises a protective layer located on the exposed areas of low tack adhesive on the peelable support film layer where unwanted heat sealing material has been removed, at least on the sides and/or ends of each array of heat seals where unwanted heat sealing material has been removed and thus a tacky surface exposed. Preferably the protective layer comprises a paper layer. The protective layer could extend over substantially the whole of the exposed tacky surface of the peelable support layer.

Preferably the peelable support film layer has a melting point above about 200° C. and more preferably has a melting point above about 250° C. and thus cannot take part in the heat sealing process, which typically takes place at a temperature in the region of 150° C. to 190° C.

Preferably the support film layer comprises a polyester film and more preferably a layer of polyethylene terephthalate (PET) film.

Preferably the individual heat seals are selected from the group of heat seals comprising: optically clear heat seals, permanent clear heat seals, solvent resistant heat seals, foil heat seals, polystyrene foil heat seals, gas permeable heat seals, pierceable heat seals and peelable heat seals and heat seals with a tab to aid peeling.

In a further preferred embodiment the individual heat seals include a unique code on the face of the seal which becomes visible to the user once the heat seal has been sealed to the top of a well and the support film removed, and preferably the unique code is a 2D barcode.

In order to accurately align the individual seals on the heat sealing product with an individual container or an array of individual containers such as wells, the alignment points preferably comprise aperture(s) in the heat sealing product and preferably the apertures take the form of optical sensor holes, allowing accurate positioning of the heat sealing product with respect to the container(s) to be sealed.

In a particularly preferred embodiment the heat sealing product further comprises location holes adapted to engage with projections or pins on or associated with a container holder or jig.

According to a further embodiment of the present invention there is provided a heat sealing product according to any preceding claim suitable for sealing one or more individual wells in an array of individual wells, said heat sealing product comprising:
(i) an array of individual heat seals set out in an array corresponding to the array of wells to be sealed, the size and shape of the individual heat seals corresponding substantially to the size and shape of the tops of the individual wells to be sealed;
(ii) a peelable support film layer coated on one side with a low tack adhesive, the low tack adhesive serving to hold the array of individual heat seals in place on the support film layer in the desired array prior to the sealing process;
(iii) alignment points in the roll or web adapted to enable the sealing product and therefore the individual seals of the sealing product to be aligned substantially exactly with respect to the individual wells to be sealed.

Preferably the size and shape of the individual heat seals may vary in a particular heat sealing product and between heat sealing products. depending on the application required.

Preferably the heat sealing product includes one or more apertures through the heat sealing product substantially devoid of both heat sealing material and support film layer.

Advantageously the heat sealing product takes the form of a roll or web and preferably the roll or web is pre-perforated for easy division into sheets before or during the heat sealing process.

Alternatively the heat sealing product can take the form of an individual sheet.

According to a second aspect of the present invention there is provided a sealing product suitable for sealing one or more individual wells in an array of wells, said sealing product comprising:
(i) an array of individual adhesive seals, the size and shape of the individual adhesive seals corresponding substantially to the size and shape of the tops of the individual wells to be sealed;
(ii) a support film layer coated on one side with a low tack adhesive, the low tack adhesive serving to hold the array of individual adhesive seals in place on the support film layer in the desired array prior to the sealing process;
wherein the sealing product is devoid of any adhesive sealing material around or between the individual adhesive seals. This invention provides for the first time an array of adhesive seals suitably sized, shaped and positioned on a support film layer, held in place by low tack adhesive, in a suitable configuration to seal an array of individual wells. Importantly, waste adhesive seal material from between and around the individual adhesive seals has been removed, and this prevents any extraneous material from becoming involved in the sealing process. This is particularly important if a heat seal adhesive is used, where the individual, free standing wells might accidently get joined together by melted waste heat seal adhesive overrun.

Preferably the sealing product comprises discreet interstitial gaps between the individual adhesive seals in the array. These discreet gaps also help to prevent accidental joining of adjacent wells by heat seal adhesive.

In a particularly preferred embodiment the sealing product further comprises a protective layer located on the low tack adhesive and adhesive seal side of the support film layer, substantially covering the low tack adhesive regions on the film layer exposed between and around the individual adhesive seals. This protective layer helps to prevent several sealing products accidently sticking to each other or sticking to some other surface and thus facilitates handling. The protective layer can be made of any suitable material that is easily removed before the sealing product is used. A particularly suitable material is a waxed paper layer.

Preferably the support film layer has a melting point above about 200° C., and more preferably has a melting point above about 250° C., and thus cannot take part in any heat sealing process, which typically takes place at a temperature in the region of 150° C. to 190° C., Preferably the support film layer comprises a polyester layer and more preferably a polyethylene terephthalate (PET) layer.

Preferably the individual adhesive seals employed in the present invention are heat activated seals, preferably selected from the group comprising optically clear heat seals, permanent clear heat seals, solvent resistant heat seals, foil heat seals, polystyrene foil heat seals, gas permeable heat seals, pierceable heat seals and peelable heat seals.

Preferably the individual adhesive seals include a unique code on the face of the seal that is visible to the user once the adhesive seal has been sealed to the top of a well, and the unique code is preferably a 2D barcode.

Preferably the sealing product further comprises alignment points adapted to enable the individual seals of the sealing product to be aligned substantially exactly with the rims of the wells to be sealed. Preferably the alignment points comprise aperture(s) in the film layer adapted to engage with projections on or associated with a well holder.

Preferably the individual wells to be sealed are arranged in a multi-well plate format, In one preferred embodiment the support film layer and thus the sealing product comprises a pre-cut strip of film. In an alternative preferred embodiment the support film layer and thus the sealing product is provided in a roll or web, and preferably the roll or web of film is pre-perforated for easy division into sheets before or during the well sealing process.

According to a further aspect of the present invention there is provided a process for sealing one or more individual containers comprising the steps of:
 a) providing a heat sealing product according to the first or second aspect;
 b) accurately aligning the individual seals in the heat sealing product with the containers) to be sealed;
 c) sealing the individual heat seals to the individual containers by applying heat and pressure to the heat sealing product;
 d) peeling away the support film layer to leave the individual sealed containers not connected to adjacent containers by any sealing material.

Preferably the process of peeling away the support film layer is performed around some form of rod or roller positioned across the sealed container(s) and preferably the angle of support film removal around the rod or roller is performed with an angle of the support film between approximately 45° and 180° to the plane of the top of the sealed container(s).

According to a further aspect of the present invention there is provided an apparatus suitable for the application of a heat sealing product according to the present invention comprising a platform adapted to accommodate the container(s) to be sealed, a conveyor system adapted to convey the platform within the apparatus, a heat sealing product delivery system adapted to deliver heat sealing product in accurate alignment over the container(s) to be sealed, a heat sealing station at which the heat sealing takes place, a support film removal station adapted to remove the support film layer.

Preferably the support film removal station incorporates a rod or roller around which the support film is carried away from the container(s) Whilst also creating a physical barrier to prevent the vessel following the support film in its passage away from the sealing process.

Preferably support film removal around the rod or roller is performed with an angle of the support film of between approximately 45° and 180° to the plane of the top of the sealed container(s).

BRIEF DESCRIPTION OF THE DRAWINGS

Preferred embodiments of the present invention will now be described by way of example only with reference to the accompanying Figures wherein.

DESCRIPTION OF THE PREFERRED EMBODIMENTS

Figure 3:
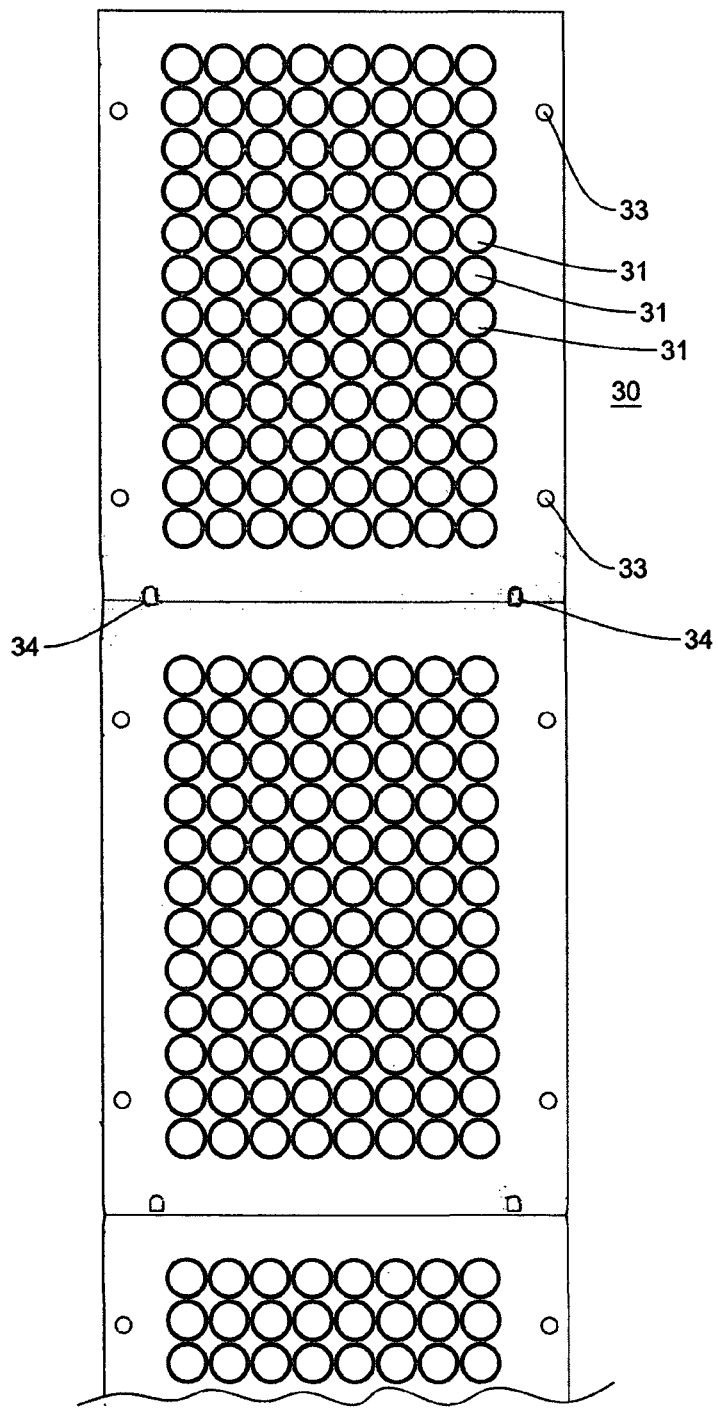
FIG. 3 illustrates a plan view of a further embodiment of the present invention being part of a roll or web of heat sealing product comprising two complete 8 by 12 matrices of individual heat seals and part of a third matrix, held on a peelable support film, with the heat seal material around the individual heat seals remaining in place.

The invention will first be described in relation to a sealing product for sealing an array of individual wells arranged in a multiwell plate format. Thus, one embodiment of the present invention is shown in FIG. 3. This embodiment comprises a roll or web of heat sealing product and FIG. 3 shows part of such a roll or web comprising two complete 8 by 12 matrices of individual heat seals and part of a third matrix of heat seals. The roll or web consists of three layers, a peelable support layer, a low tack adhesive layer, and a heat seal layer. Looking down on FIG. 3, the peelable support layer is uppermost and the bottom or underside surface of the support layer is coated with a layer of low tack adhesive. This low tack adhesive layer is used to bond the support layer to the heat seal layer, the heat sealing surface of the heat seal layer being on the very bottom or underside of the web as shown in FIG. 3, looking down from above the page.

A series of individual heat seals are cut or stamped through the heat seal layer, the cutter or cutters being applied from the heat seal layer side of this composite web, or the underside of the web as shown in FIG. 3. Care must be taken to cut completely through the heat seal layer to create the discreet individual heat seals, which are then held in place by the low tack adhesive on the bottom of the peelable support layer.

It will be appreciated from FIG. 3 that the individual heat seals are positioned very close together in the matrix, almost touching in fact, as they must be for an array of 96 individual wells arranged in a conventional 96 multi-well plate format. This is very difficult, if not impossible, to achieve using one cutter to cut out all 96 heat seals. Instead, two or more cutters are used, working together in a coordinated, synchronised and calibrated fashion. For example, one cutter can cut out the odd-numbered heat seals in a row while, and in a second operation, a second cutter can cut out the even numbered heat seals, With the appropriate array of cutters this cutting process can be run as a continuous process. The same cutters can be used to very accurately cut any location holes required (see below).

A further advantage of adhering the heat seal layer to the support layer prior to cutting out the individual heat seals is that the cutters) can penetrate slightly into the support layer without any detriment to the finished product.

The support film layer can be formed from any suitable film material, including a polymeric film material, which cannot take part in the heat sealing process. In the case of a heat sealable film, this requires a film material with a melting point above the temperatures used in the heat sealing process, Typically heat sealing takes place at between 150° C. and 190° C. So the support film layer material preferably has a softening point above about 200°

C. and preferably a melting point above about 250° C. Suitable film materials will be selected by the materials specialist but polyester films, especially polyethylene terephthalate (PET), are particularly suitable for this application. In terms of a suitable thickness for the support film layer, 50 to 100 microns is typical, but thinner or thicker films could be used as determined by the appropriate expert.

The outward or upward facing surface of the support film layer does not require any special coating. The inward or downward facing surface of the support film layer, being that surface in contact with and carrying the heat seals, is coated with a layer of low tack adhesive 22. This low tack adhesive layer serves to retain the individual heat seals in place until after the heat sealing process has taken place, after which time the support film layer, along with the low tack adhesive and any surplus heat seal film, is removed by peeling it away from the sealed wells (see below). It will therefore be appreciated that the low tack adhesive layer should preferably not take part in the sealing process, and the strength of the tack of the adhesive should not change or if it does change should get slightly weaker during or after the heat seal process. An intermediate layer of adhesive or other material, or surface treatment, (not shown) may be used to ensure that the low tack adhesive adheres strongly to the support film layer.

The most suitable low tack adhesive for this application will be selected by the appropriate expert.

An important feature of the present invention is that any suitable heat seal film from any manufacturer can be used to form the heat seal layer, so long as its outer surface will adhere to the low tack adhesive. Suitable heat sealable films include optically clear heat seals, permanent clear heat seals, solvent resistant heat seals, foil heat seals, polystyrene foil heat seals, gas permeable heat seals, pierceable heat seals and peelable heat seals. Some of these films are themselves laminate materials made up of several layers irreversibly bonded together by temperature or permanent adhesives, while others are lacquered heat seals where a substrate such as a foil is coated with a heat seal lacquer.

In order to substantially precisely align the individual adhesive seals with the rims on the top of the wells to be sealed, apertures 33 are provided at strategic points around the perimeter of the support film layer. These apertures are sized, spaced and located to correspond with pins on a jig or other tool placed around or over the multi-well plate array, or a jig that the multi-well plate sits on.

It will be appreciated that the sealing product of the present invention can be provided in the form of individual sheets as well as a continuous roll or web described above. When the sealing product is provided as a continuous roll or web, this may be pre-perforated for easy division into strips or sheets during the sealing process. Alignment markers and robotic handling means, for handling the sheets/web, for removing the protective layer, and for peeling off the support film layer after sealing can also be provided. Such markers and robotic handling means are common place in heat seals for use in heat sealers designed to use a roll of heat sealable material. They may include optical sensor holes 34 for accurately positioning a roll fed version and jig location holes 33 to fit over pins or projections on a jig for sheeted versions.

The various location holes are advantageously cut with one, or more than one, of the same cutter arrays used to cut out the individual heat seals. This means that the individual heat seals and the alignment holes are very accurately placed with respect to each other. As a direct result of this, heat sealing product can be aligned very accurately with respect to the individual wells to be sealed. Typically an alignment accuracy between seals and wells of +/−0.2 mm can be achieved as a result of this cutting technique and more preferably an accuracy of +/−0.1 mm is possible. This is particularly important because of the very small gaps between adjacent wells in a typical multi-well plate format.

In operation, an array of individual wells is placed into a heat sealer and a sealing product according to the invention placed over the top of the wells, in the correct accurate alignment of individual seals with individual wells. The heat sealing process is then performed, and in a further step the support film layer is peeled off, away from the sealed wells, leaving the individual sealed wells as separate, intact individual wells, not connected to adjacent wells by any sealing material. In the process to remove the support film layer an upward force is applied to the support film whilst holding down the microplate or other well support. As a result the support film is peeled or pulled back away from the microplate and the wells. The support film is thus separated from the individual sealed wells and can ultimately be discarded. Friction between the side of the wells and the sides of the holes in which they sit in the microplate or support helps to retain the wells in their original array format.

The peeling movement to remove the support film layer, and to remove the unwanted waste heat sealing material created during manufacture of the sealing product, may be done in any desired direction, and at any desired angle with respect to the top of the array of sealed wells. For example, the support film may be peeled away across the array of wells in a direction A1 to A12. Alternatively the peeling process may start at one corner of the array of seals and proceed at an angle to the longitudinal axis of the sealing product strip or web, The peeling processes can be facilitated by holding the sealing product down with some form of rod, roller, bar or blade positioned across the array of sealed wells where the rod or roller tracks across the product as the peeling operation takes place.

In an automated sealing and support film removal instrument, described in more detail below, it is the array of wells, typically held in some form of jig or support, which moves under the rod or roller. Other than possibly rotating, the rod or roller remains static inside the machine. The waste support film, together with unwanted waste heat sealing material is preferably collected onto a roll or drum for eventual disposal. Furthermore, the angle at which the support film removal is removed can vary depending on the design of the instrument but an angle of between approximately 45° and 180° to the plane of the top of the sealed wells is envisaged.

The removal or peeling away of the support film therefore ideally takes place around a bar or specific blade that is positioned directly above the plate. This has the effect of holding the parts down, preventing them moving vertically up with the waste film and support layer. in addition to this, the separation process preferably requires the forward movement of the plate or array of tubes relative to this bar at substantially exactly the same speed at which the support film is pulled away, especially in an automated instrument. The shuttle speed moving the plate back out of the sealer must run at substantially the same speed as the pinch rollers pulling the waste film away from the wells.

The peeling away operation to separate the sealed wells from the support film layer can be carried out manually, but robotic handling is preferred in many applications. To assist with robotic handling some form of robotic handling means can be incorporated into the support film layer. This handling means can take a wide variety of forms such as holes or apertures in one or more edges of the strip (not shown). A robotic hook or finger can be inserted into one or more of these holes in order to apply the necessary upwards force to carry out the peeling process. These hole(s) can be located along the short edge of the film or along the long edge, or even along opposing edges.

An alternative handling means may be provided by one or more graspable tabs (not shown) again located along the short edge of the film, or along the long edge of the film, or along opposing edges.

The heat sealing product of the present invention has many other uses in addition to sealing individual wells in a multi-well plate format. It can be used to seal a wide range of containers of various shapes, sizes and depths, and containers used for a very wide range of applications. In addition, apertures can be cut out of the heat sealing layer where required, to leave a void. Providing the container to be sealed has a rim that will accept a heat seal, and that a heat sealer is available that is large enough to accommodate the container, then any container may be sealed using this invention. Where there are multiple containers in an array it is also possible to seal some of the containers with one type of heat seal and other containers with a different type of heat seal. such is the flexibility of this invention.

This process lends itself to automation and one embodiment or aspect of the invention provides an apparatus or device for carrying out such a process. A microplate or tray containing items to be sealed is placed on a platform or conveyor belt and transported on this transport system to a seal application station at which a sealing product according to the invention is applied over the top of the container(s) to be sealed. The individual seal(s) of the sealing product are carefully aligned with the rims of the container(s) to be sealed, for example individual wells in an array of wells.

The heat seals are then applied to the individual containers. Because the seals are heat activated it may be necessary to allow the resultant combination to cool before removing the support film.

The microplate or tray is then held down to resist an upward force applied to the support film. This holding down operation can be carried out in a number of ways depending on the design of the microplates or trays being used. For example, if the microplates/tray has a skirt, and the lower edge of the skirt has an outwardly directed rim, then the microplate/tray can be held down by means of this rim. Alternatively, such microplates/trays often have apertures, indentations or depressions around or near their edges. A downward force or pressure can be applied through or by means of these features to resist the upward force being applied to peel or pull back the support film away from the sealed wells.

In the present description the terms "downward" and "upward" relate to those directions as applied to a microplate/tray in the configuration in which it is normally used and stored. So a downward force would press the microplate/tray into the plane that it is resting on and an upward force would tend to move the support film up and away from the sealed wells.

The support film removal process may take place at a separate station, away from the seal application station, or it could be carried out at the seal application station. Where a continuous roll or web of sealing product is used it is not essential to provide robotic handling means in the support film, as the action of pulling or lifting the roll of film away from the container(s) as they pass through the support film removal station will cause the support film to separate from the array of sealed wells. The support film can be collected on a collection roller/drum or take-up reel and discarded at an appropriate time. As an alternative the support film may not be reeled up but simply collected in a waste receptacle.

The angle at which the support film layer is peeled back and the type of support used to hold down the container(s) and which the support film is 'peeled' around during the removal process are important. Preferably the process of peeling away the support film layer is performed around some form of blade, bar, rod or roller positioned across the sealed container(s) and preferably the angle at which the support film removal is performed is preferably with an angle of the support film between approximately 45° and 180° with respect to the plane of the top of the sealed container(s).

Where individual sheets of sealing product are used to seal an array of individual wells, these sheets can be provided as an input feed to the sealing apparatus or individual sheets can be formed during the process from a continuous roll or web of adhesive film. However, because individual seals have been cut out from the heat sealing layer it will be understood that individual sheets are not necessarily required. This is because as the support film layer is removed after the heat sealing process this takes with it any excess heat seal material, leaving behind individual sealed containers.

The motion of a microplate/tube rack of wells through the various stages and operations in the apparatus may be controlled by one or more microprocessor controllers, or may be controlled manually by an operator.

The sealing product can be manufactured in a number of ways. In one such process a support film layer of PET is provided and coated on one side with a low tack adhesive. The low tack adhesive side of the support film layer is applied to the upper side of a heat sealable film. That is to say, the side of the heat sealable film which does not contact the rims of the wells during the heat sealing process is applied to the low tack adhesive side of the support film.

In a further step the individual heat seals are cut out from the heat seal layer using one or more cutters of the desired size, shape and configuration, working from the side of the heat sealable film that will contact and seal to the containers. A series of cutters may be required because the gaps between adjacent wells in a 96 multi-well plate array is very small; so alternate seals can be cut out with one cutter and the remaining seals cut out with another cutter. Alternatively the cutting could be done as part of a continuous process where rows of seals, or some other pattern of seals, are cut out by separate cutters in a pre-arranged order and fashion until all the necessary seals have been formed.

In summary, the space or gap between individual cut out seals is too small to allow one cutting tool to cut out all 96 individual seals in a single cutting operation, so some form of sequential seal cutting operation is required.

In an optional further step in the production process the waste material between and around the individual seals is peeled away from the low tack support film layer and discarded. The strength and integrity of the heat seal material, and the tack strength of the low tack adhesive, are such that the waste material can be removed without breaking up, even though the strips of waste between the seals may be very thin.

Figure 1:
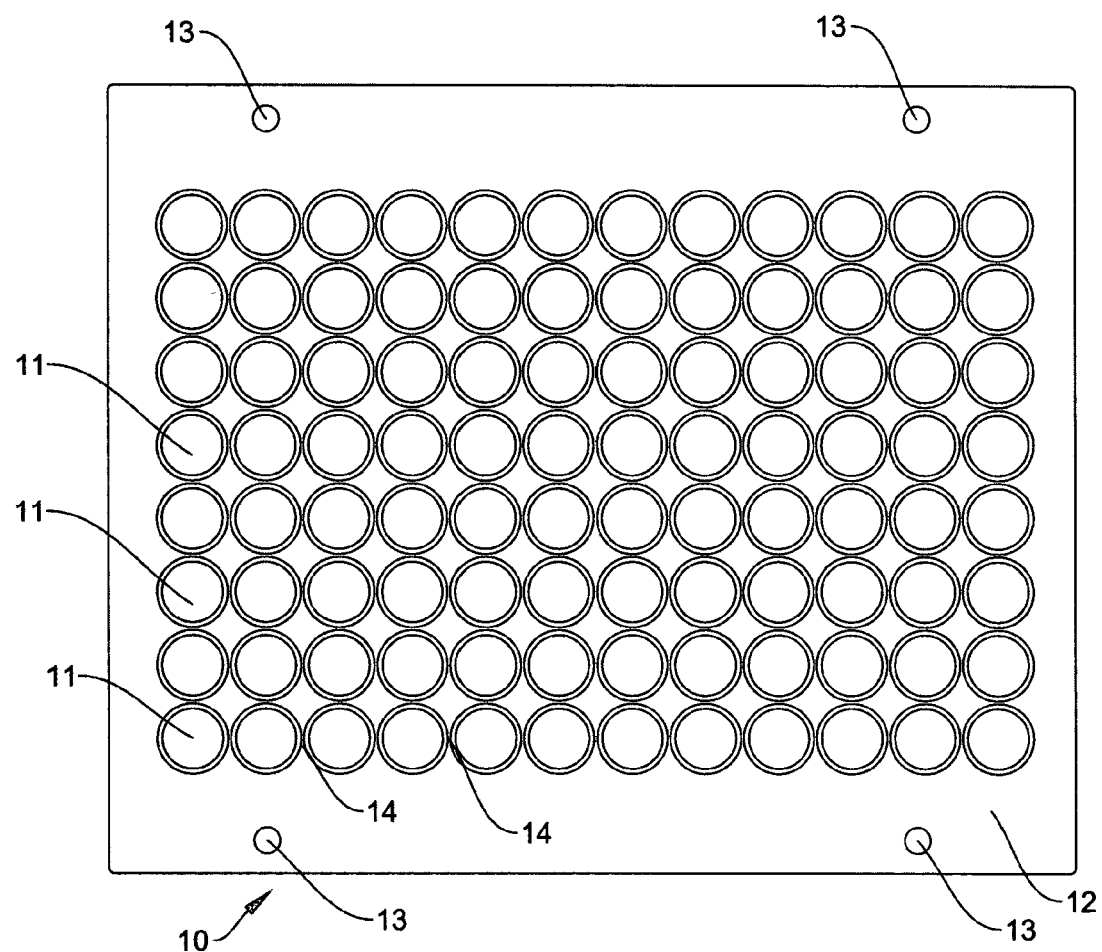
FIG. 1 illustrates a plan view of a sealing product according to one embodiment of the present invention showing an 8 by 12 matrix of individual adhesive seals held on a support film layer.
Figure 2:
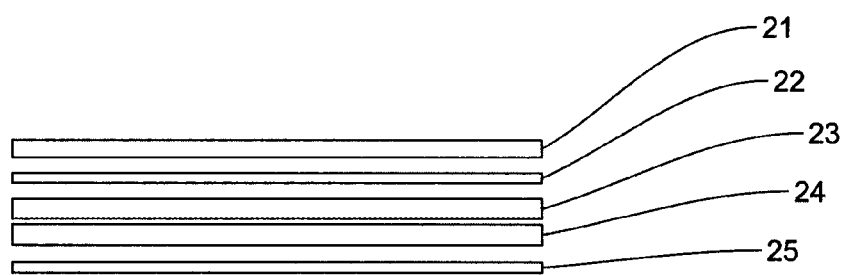
FIG. 2 illustrates a schematic view of the various material layers used to create the sealing product in FIG. 1.

A product produced by operating this process is shown in FIGS. 1 and 2 and represents a further embodiment of the invention. FIGS. 1 and 2 show a sealing means or sealing product 10 which consists of a series of individual heat seals 11 arranged in a fixed array on a support film layer 12. In this example there are 96 individual heat seals 11 arranged in an 8 by 12 matrix. In the example shown in FIG. 2 the heat sealable film comprises two layers, a foil layer 23 and a heat fusible plastics layer 24, such as polyethylene or polypropylene bonded to the foil layer. There may be one or more additional layers to the heat sealable film (not shown) such as an adhesive layer to bond the foil to the fusible plastic layer, and/or a protective layer such as a polyester layer over the top of the foil layer.

The waste heat sealable film not required in the individual heat seals 11 has been removed as described above. Having removed the waste this leaves small interstitial gaps 14 between adjacent seals. These interstitial gaps are important because their presence means that the heat sealing process does not link adjacent wells during the sealing process, or link a sealed well to adjacent waste heat seal material.

It will be appreciated that during the cutting process the cutter must penetrate completely through the heat sealing film. In order to achieve this, the cutter may also penetrate a short distance into the support film layer. The thickness of the support film layer is such that it can accommodate partial penetration yet still have sufficient strength and integrity to allow it to be peeled off after the sealing process in one piece. Typically the support film layer is in the order of 100 microns to 50 microns thick.

Once the waste sealing material has been removed this leaves an area of low tack adhesive surface exposed on the back of the support film layer. This adhesive surface can be covered by a protective layer in order to make the sheets or roll easier to handle. Any suitable material that adheres weakly to the low tack adhesive can be used. Paper is one suitable material that is both readily available and relatively inexpensive. A layer of polyester film could also be used. Because the interstitial gaps between the individual heat seals are quite small in the above example, protective material may only need to be applied to the larger areas of exposed tacky surface, which is down each long side of the roll/sheet and/or along the shorter ends of each seal array. This protective layer is removed prior to the heat sealing process, and preferably immediately prior to the heat sealing process.

An alternative to the use of a protective layer in a process using a roll or web of heat sealing product with exposed low tack adhesive is to use a special non-stick surface on the rollers inside the machine. A dimpled silicone roller wrap as supplied by Tesa The present products or processes also allow for a unique code to be applied to the top of each heat seal. This is preferably done prior to attaching the heat seal layer to the support layer. The unique code can be printed onto the heat seal and can be in the form of a 2D barcode. The technology for printing multiple unique 2D barcodes on a substrate is known per se.

What is claimed is:

1. A process for sealing individual containers comprising the steps of:
   a) providing a heat sealing product comprising:
      (i) a plurality of discrete individual heat-activated adhesive seals set out in a heat-activated seal layer of heat-activated sealing material in a configuration corresponding to the shape and configuration of the containers to be sealed, the size and shape of the discrete individual heat seals corresponding to the size and shape of the tops of the individual containers to be sealed; and
      (ii) a peelable support film layer coated on one side with a low tack adhesive, the low tack adhesive serving to hold the discrete individual heat-activated adhesive seals in place on the support film layer in the desired configuration prior to the sealing process;
      (iii) the heat sealing product being devoid of any heat-activated sealing material around the individual heat-activated adhesive seals and devoid of any heat-activated sealing material between the individual heat-activated adhesive seals, waste material of the heat-activated seal layer not required in the individual heat-activated adhesive seals having been removed resulting in discrete interstitial gaps between the individual heat-activated adhesive seals;
   b) aligning the individual heat-activated adhesive seals in the heat sealing product with the containers to be sealed;
   c) sealing the individual heat-activated adhesive seals to the individual containers by applying heat and pressure to the heat sealing product;
   d) peeling away the support film layer to leave the individual sealed containers not connected to adjacent containers by any sealing material.

2. A process according to claim 1 wherein the process of peeling away the support film layer is performed around a rod or roller positioned across the sealed containers.

3. A process according to claim 2 wherein the angle of support film removal around the rod or roller is performed with an angle of the support film of between approximately 45° and 180° to the plane of the top of the sealed containers.

4. A process according to claim 1 wherein the support film layer has a melting point greater than about 200° C.

5. A process according to claim 1 wherein the support film layer has a melting point greater than about 250° C.

6. A process according to claim 1 wherein the support film layer comprises a polyester film.

7. A process according to claim 1 wherein the support film layer comprises a polyethylene terephthalate (PET) film.

8. A process according to claim 1 wherein the individual heat-activated seals are selected from the group of heat seals comprising: optically clear heat seals, permanent clear heat seals, solvent resistant heat seals, foil heat seals, polystyrene foil heat seals, gas permeable heat seals, pierceable heat seals, peelable heat seals, and heat seals with tabs to aid peeling.

9. A process according to claim 1 wherein each of the individual heat-activated adhesive seals includes a unique code on the face of the seal which becomes visible to the user once the heat-activated adhesive seal has been sealed to the top of the individual container and the support film removed.

10. A process according to claim 9 wherein the unique code is a 2D barcode.

11. A process according to claim 1 wherein the heat sealing product comprises alignment apertures, the process further comprising with the alignment apertures aligning the heat sealing product with respect to the individual containers to be sealed.

12. A process according to claim 1 wherein the heat sealing product takes the form of a roll or web.

13. A process according to claim 12 wherein the roll or web is perforated for easy division into sheets.

14. A process according to claim 1 wherein the heat sealing product takes the form of an individual sheet.

* * * * *

UNITED STATES PATENT AND TRADEMARK OFFICE
CERTIFICATE OF CORRECTION

| | | |
|---|---|---|
| PATENT NO. | : 12,138,895 B2 | Page 1 of 1 |
| APPLICATION NO. | : 18/059317 | |
| DATED | : November 12, 2024 | |
| INVENTOR(S) | : Peter Collins | |

It is certified that error appears in the above-identified patent and that said Letters Patent is hereby corrected as shown below:

On the Title Page

Add item (30):
-- (30) Foreign Application Priority Data: October 27, 2016 (GB).............1618215 --.

Signed and Sealed this
Twenty-second Day of April, 2025

Coke Morgan Stewart
*Acting Director of the United States Patent and Trademark Office*